UNITED STATES PATENT OFFICE.

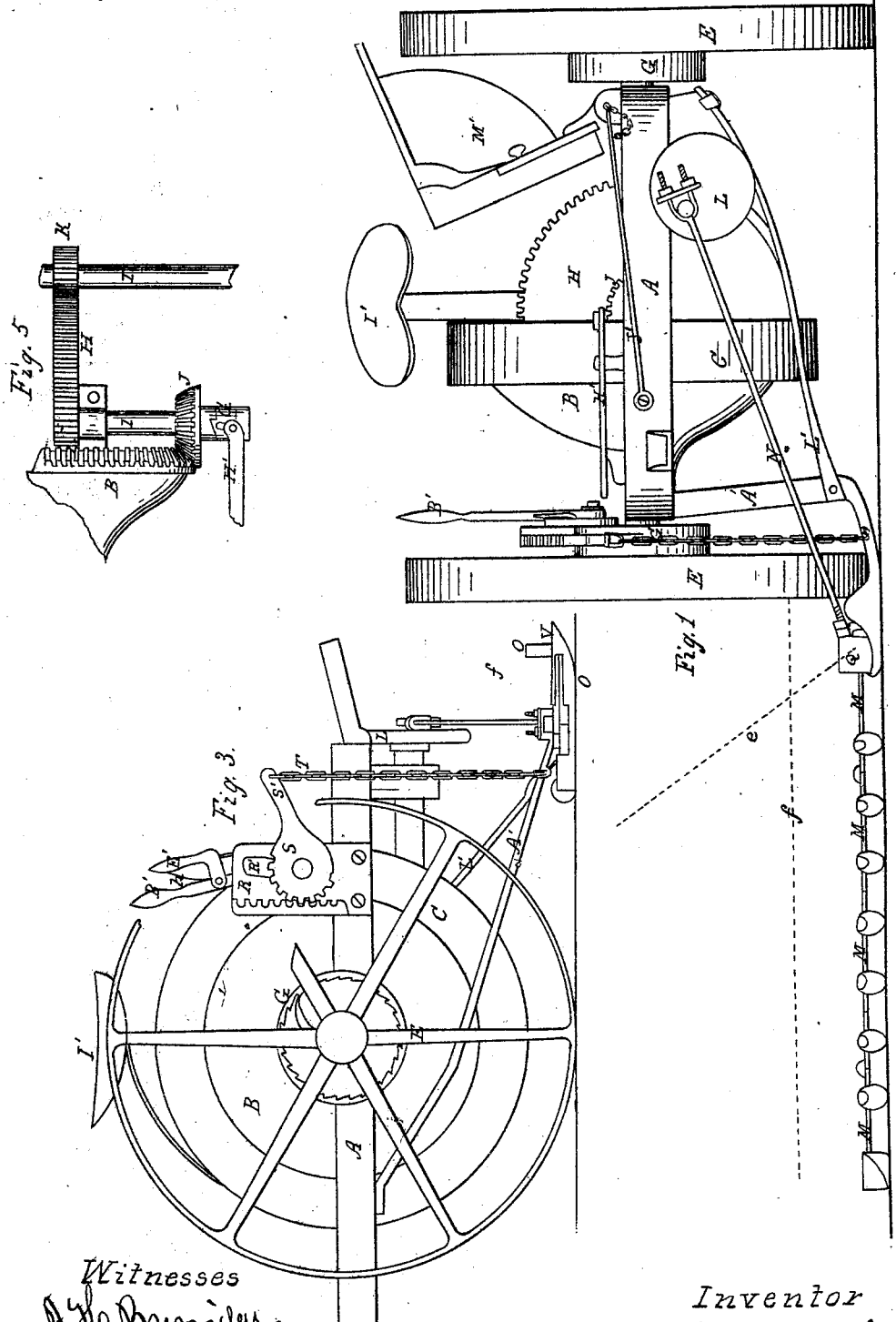

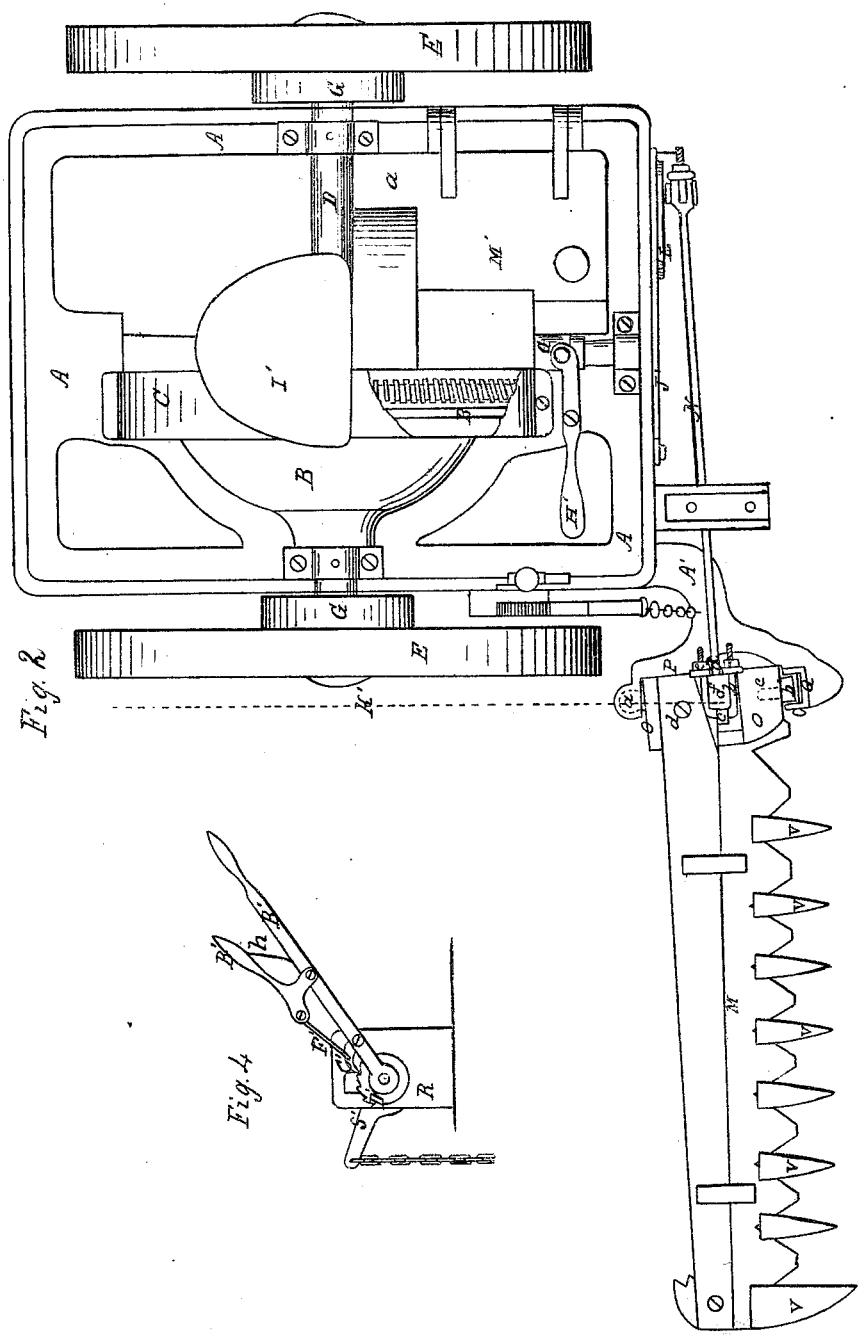

JOHN KERSHAW, OF KENT, OHIO.

IMPROVEMENT IN HARVESTERS.

Specification forming part of Letters Patent No. 91,347, dated June 15, 1869.

*To all whom it may concern:*

Be it known that I, JOHN KERSHAW, of Kent, in the county of Portage and State of Ohio, have invented certain new and useful Improvements in Harvesters; and I do hereby declare that the following is a full and complete description of the same, reference being had to the accompanying drawings, making part of this specification, in which—

Figure 1 is a front view of the machine; Fig. 2, a view of the top; Fig. 3, a side view. Figs. 4 and 5 are detached sections.

Like letters of reference refer to like parts in the different views.

This invention has for its object the inclosing of the driving-gear of a harvester entirely within a case, thereby preventing it from becoming clogged by the cut grass, and from receiving injury or causing injury to those operating it, the gearing being so arranged that a more direct application of the power to the cutting apparatus is thereby obtained; and, furthermore, so hanging the cutter-bar as to obtain to it a vibratory movement, more fully described hereafter.

In Fig. 2, A represents a frame, in which the gearing is arranged. Said gearing consists of the main wheel B, a detached view of which is shown in Fig. 5. The periphery of said wheel is inclosed in the case C, whereas the middle of the wheel is made close and of a dish-like shape, as shown in Fig. 6, which, together with the side of the case C, forms a protection on one side for the gearing. The wheel alluded to is mounted upon the shaft D, Fig. 2, to which also are secured the driving-wheels E. Said wheels are each provided with a pawl and ratchet, F, Fig. 3, inclosed in the shell G, whereby the wheels are disengaged from the shaft on backing the machine, thereby preventing the working of the machinery.

H', Fig. 1, a detached view of which is shown in Fig. 5, is a transfer-wheel, secured to the shaft I, and operated by the main wheel B, by means of the bevel-wheel J engaging in said wheel, and operated thereby, as will hereinafter be shown. On the inner end of shaft I is keyed a pinion-wheel, K, also indicated by the dotted lines $a$, Fig. 2. Said pinion is made to engage the transfer-wheel H. To the outer end of the shaft is keyed the crank-wheel L, whereby the knives M are operated, by means of the pitman N. The immediate connection of the pitman to the cutter-bar is made by the staple $b$, Fig. 2, pivoted to the cutter-bar by a hook, $c$, in which it works, and to the rod by the cross-bar $d$, in which the shanks of the staple are confined. The rod enters the bar between the shanks, and is thereto secured in a free manner, so that a flexible connection is obtained.

The cross-bar is secured to the staple by means of the nuts $e\ e$, whereby the rod and bar are brought to bear against the block $f$, interposed between the bar and hook, thereby preventing too much freedom in the lateral movement of the connection.

The finger-bar is so connected to the machine that there is given to it a vibratory movement, so that the points of the guards L are allowed to move upward, so that on passing over uneven ground the points of the guards will not catch or run into the dirt. This vertical movement is obtained by means of a ball-and-socket joint, $a$, Fig. 2.

The ball, as will be observed, projects from the rear side of the shoe O, arranged between the arms of the stay or coupling brace P, a socket being formed on the inside of the rear arm for the reception of the ball. $b'$ is a lug-wrist, pivoted to the opposite side of the shoe, as indicated by the dotted lines $c$. Said lug is fitted in a guide, Q, forming the inside of the front arm of the stay, and in which the lug is free to move upward or downward, as the unevenness of the ground may affect the front side of the finger-bar, and guards the ball-and-socket joint, answering as a pivot for such vertical movement. To the shoe or clamp just referred to the end of the finger-bar is secured by means of the bolt $d$.

It will be obvious that by this means of connecting the finger-bar to the stay the said bar can be elevated, as indicated by the line $e$, Fig. 1, thereby allowing it to pass close to stumps, stones, or other obstructions in the course of its work, thus giving to the finger-bar a flexible connection to the machine, whereby it can adapt itself to the unevenness of the ground, and be lifted up to the position indicated by the line $e$, above referred to.

The horizontal elevation of the finger-bar, for the purpose of avoiding obstructions and moving from place to place, is effected by means of a rack and wheel, R S, Fig. 3, a detached view of which is shown in Fig. 4. The wheel referred to is provided with an arm, S', to the extreme end of which is attached a chain, T, the opposite end of said chain being connected to the stay P or arm A', of which the stay forms the lower or free end, as seen in Fig. 2. Said wheel is attached to the rack by means of a bolt passing through a slot therein, and in which the bolt slides as the wheel is operated in the rack by means of the lever and pawl B' C'.

Thus the finger-bar, as represented in Figs. 1 and 3, is upon the ground. In this position the wheel S is at the lower end of the slot R'. Now, on depressing the end of the lever B', attached to the wheel S, said wheel will roll upward by virtue of its engagement with the rack, thereby carrying up the arm S', which will elevate the drag-bar, it being connected to the arm by means of the chain, as above said.

When thus lifted from the ground it is secured at any particular height by means of the pawl C', Fig. 4, attached to the lever B'. Said pawl is operated by the supplementary lever E', to which it is connected by the link F, said supplementary lever being pivoted to the lever B', and actuated in conjunction therewith and with the spring $h$.

The finger-bar, on being thus elevated, as indicated by the lines F, will pass clear of any ordinary obstruction; or the machine can now be run from place to place with the coupling-brace and cutter-bar free of the ground, to which it can be immediately dropped, by simply depressing the arm of the supplementary lever E', which will disengage the pawl from the ratchet-wheel and allow the wheel S to descend and the bar to come to the ground, as before. This machine is thrown into and out of gear by means of the clutch G', actuated by the lever H', the same being operated by the foot of the driver while mounted upon the seat I'.

J' is a link, whereby the cutter and finger bars are retained in a vertical position, as indicated by the dotted line K', Fig. 2, in which position it is elevated for the greater convenience of transportation from field to field. L' is a brace, whereby the coupling-brace and arm are secured to the machine, and prevented from lateral displacement.

Access is had to the inside or gearing for oiling, &c., through the door M', which forms a section of the top of the machine. In Fig. 1 said door is shown as being open, disclosing a portion of the gearing.

It will be seen that all the gearing of this machine is inclosed; hence there can be no clogging of the wheels in consequence of the cut grass becoming caught up by the wheels, which, in the ordinary machine, is of common occurrence, as the gearing below the frame is more or less exposed, and therefore liable to take up the cut grass on passing over it.

This machine is strong and simple in its construction and arrangement, hence is not liable to become out of order if arranged with ordinary care and skill. The working gearing all being inclosed, as above described, makes the machine safe, so that those operating it cannot get injured by becoming caught in it, nor, as before said, can the gearing become clogged by the cut grass.

The simple arrangement of the gearing is such that it works freely and with little loss of power by friction; hence the machine will work with ease and facility.

What I claim as my improvement, and desire to secure by Letters Patent, is—

1. The arrangement and combination of the wheel B, case C, and door or top M', for the purpose set forth.

2. The staple $b$, bar $d$, and block $f$, in combination with the hooks $c$, pitman, and cutter-bar, constructed and arranged in the manner and for the purpose set forth.

3. The ball-and-socket joint $a$, pivoted lug or wrist $b'$, in combination with the shoe O and coupling-brace P, constructed and arranged in the manner and for the purpose set forth.

4. The rack R, wheel S, ratchet and pawl D' C', and levers B' E', all arranged and combined to operate in the manner as and for the purpose set forth.

JOHN KERSHAW.

Witnesses:
  V. B. JENKS,
  J. E. KERSHAW.